United States Patent
Matsuo et al.

(10) Patent No.: US 8,472,522 B2
(45) Date of Patent: Jun. 25, 2013

(54) VIDEO ENCODING METHOD AND DECODING METHOD, APPARATUSES THEREFOR, PROGRAMS THEREFOR, AND STORAGE MEDIA WHICH STORE THE PROGRAMS

(75) Inventors: Shohei Matsuo, Yokosuka (JP); Seishi Takamura, Yokosuka (JP); Kazuto Kamikura, Yokosuka (JP); Yoshiyuki Yashima, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 531 days.

(21) Appl. No.: 12/526,896

(22) PCT Filed: Feb. 20, 2008

(86) PCT No.: PCT/JP2008/052859
§ 371 (c)(1),
(2), (4) Date: Aug. 12, 2009

(87) PCT Pub. No.: WO2008/102805
PCT Pub. Date: Aug. 28, 2008

(65) Prior Publication Data
US 2010/0027655 A1 Feb. 4, 2010

(30) Foreign Application Priority Data
Feb. 23, 2007 (JP) ................. 2007-043190

(51) Int. Cl.
*H04N 7/12* (2006.01)
*H04N 11/02* (2006.01)
*H04N 11/04* (2006.01)

(52) U.S. Cl.
USPC ................. 375/240.13; 375/240.12

(58) Field of Classification Search
USPC ................. 375/240.13
See application file for complete search history.

(56) References Cited

U.S. PATENT DOCUMENTS

2001/0017942 A1 8/2001 Kalevo et al.
2003/0202588 A1 10/2003 Yu et al.
(Continued)

FOREIGN PATENT DOCUMENTS

EP 1 085 763 A3 4/2001
JP 2003-520531 A 7/2003
(Continued)

OTHER PUBLICATIONS

Su et al., "Fast Multiple Reference Frame Motion Estimation for H.264/AVC", IEEE Trans. Circuit and Systems for Video Technology, vo. 16, No. 3, Mar. 2006.*

(Continued)

*Primary Examiner* — Christopher S Kelley
*Assistant Examiner* — Hee-Yong Kim
(74) *Attorney, Agent, or Firm* — Harness, Dickey & Pierce, P.L.C.

(57) ABSTRACT

A video encoding method includes setting candidates for reference pixels to pixels within a predetermined distance range measured from an encoding target block; generating a predicted signal by sequentially selecting reference pixels used for the intra prediction of the encoding target block from among the reference pixel candidates while changing a distance condition from the encoding target block, and by generating the predicted signal based on the reference pixels for each distance condition; computing an encoding cost required for subjecting the encoding target block to intra prediction encoding using each generated predicted signal; finally determining reference pixels used for the intra prediction of the encoding target block based on each computed encoding cost; and encoding information which indicates the position of the determined reference pixels.

10 Claims, 16 Drawing Sheets

U.S. PATENT DOCUMENTS

2004/0213348 A1* 10/2004 Kim et al. ............. 375/240.12
2005/0243920 A1   11/2005 Murakami et al.

FOREIGN PATENT DOCUMENTS

| RU | 2 258 320 C2 | 8/2005 |
| RU | 2005 108 921 A | 9/2006 |
| RU | 2 369 038 C1 | 9/2009 |
| TW | I253867 | 4/2006 |
| WO | WO 2005/107267 A1 | 11/2005 |
| WO | 2007/004678 A1 | 1/2007 |

OTHER PUBLICATIONS

Chen, Tsung-Shien, "Fast Intra-Prediction Mode Decision Algorithm for H.264 Video Coding Standard," Master Thesis, I-Shou University, pp. 11-23, 36-49, and 65, Jun. 2006.

Sakae Okubo, Shinya Kadono, Yoshihiro Kikuchi, and Teruhiko Suzuki, Revised edition of H. 264/AVC Textbook, R&D, Jan. 1, 2006, p. 106-112, 259-262, 2006.

ISO/IEC 14496-10, Information technology—Coding of audio-visual objects—, Second edition, Oct. 1, 2004, p. 103-113.

ITU-T Study Group 16—Questions 6/16: "Draft new Corrigendum 1 to H.264," Advanced video coding for generic audiovisual services, pp. 118-136, 2005.

Yu, Siu-Leong, et al., "New Intra Prediction Using Intra-Macroblock Motion Compensation," ITU Study Group 16, Video Coding Experts Group, ISO/IEC MPEG & ITU-T VCEG (ISO/IEC JTC1/SC29/WG11 and ITU-T SG16 Q.6), May 10, 2002.

Matsuo, Shohei, et al., "Extension of Intra Prediction Using Multiple Reference Lines," ITU Study Group 16, Question 6, Video Coding Experts Group, ISO/IEC MPEG & ITU-T VCEG, Apr. 19, 2007.

Richardson, Jan, "Video encoding H.264 and MPEG-4 new generation standards," Moscow, 2005, pp. 150-154 and 293-300 (pp. 109-114 and 227-232 of English translation).

Decision on Grant for Russian Patent Application No. 2009130805 dated Jul. 23, 2012.

* cited by examiner

FIG. 14

|  | refline_x | | | |
|---|---|---|---|---|
|  | 0 | 1 | 2 | 3 |
| refline_y 0 | p0 (58.3%) | p1 (9.3%) | p3 (6.8%) | p5 (6.5%) |
| 1 | p2 (7.8%) | N/A | N/A | N/A |
| 2 | p4 (5.6%) | N/A | N/A | N/A |
| 3 | p6 (5.7%) | N/A | N/A | N/A |

VIDEO ENCODING METHOD AND DECODING METHOD, APPARATUSES THEREFOR, PROGRAMS THEREFOR, AND STORAGE MEDIA WHICH STORE THE PROGRAMS

TECHNICAL FIELD

The present invention relates to a video encoding method for encoding video images and a corresponding apparatus; a video encoding program for implementing the video encoding method and a computer-readable storage medium which stores the program; a video decoding method for decoding data which has been encoded using the video encoding method and a corresponding apparatus; and a video decoding program for implementing the video decoding method and a computer-readable storage medium which stores the program.

Priority is claimed on Japanese Patent Application No. 2007-043190, filed Feb. 23, 2007, the contents of which are incorporated herein by reference.

BACKGROUND ART

In intra prediction encoding which performs prediction within a single frame, it is impossible to achieve compression efficiency as high as that achieved by inter prediction encoding which performs prediction between different frames. Therefore, an intra prediction encoding method for achieving a high degree of compression efficiency has been desired.

The intra prediction which performs prediction within a single frame in spatial dimensions has been employed in video coding standards from H.264/MPEG-4 AVC (e.g., see pp. 106-113 of Non-Patent Document 1).

The intra prediction is performed using a block unit, and in H.264/MPEG-4 AVC, three block sizes (4×4, 8×8, and 16×16) can be used for the luminance signal. For each block size, a plurality of prediction modes are provided for mode selection.

More specifically, for block sizes of 4×4 and 8×8, nine prediction modes are provided as shown in FIG. 5-3 on page 108 of Non-Patent Document 1 for the block size of 4×4, and in FIG. 11-6 on page 261 of Non-Patent Document 1 for the block size of 8×8, where eight prediction modes other than "prediction mode 2" have a prediction direction. Additionally, for a block size of 16×16, four prediction modes are provided as shown in FIG. 5-8 on page 111 of Non-Patent Document 1.

For the chrominance signal, only the block size of 16×16 can be used, and four prediction modes are provided as shown in FIG. 5-9 on page 112 of Non-Patent Document 1. For the prediction direction, the same definition as that applied to the 16×16 block size for the luminance signal is provided. However, the correspondence between the prediction mode number and the prediction direction is different between both signals.

The above items can also be explained in detail in lines 118 to 136 of Non-Patent Document 2.

For every block size and prediction mode, reference pixels used in the intra prediction always belong to a block adjacent to an encoding target block, and are closest to the encoding target block.

FIG. 18 shows a concrete example in which the encoding target block has a block size of 4×4 for the luminance signal, and a vertical prediction (prediction mode 0) is performed. In the following explanations, the luminance signal is always targeted unless a specific explanation is provided.

As shown in FIG. 18, with respect to the encoding target block, a pixel X in the upper-left block; pixels A, B, C, and D in the upper block; pixels E, F, G, and H in the upper-right block; and pixels I, J, K, and L in the left block can be used in the intra prediction.

Among the pixels, in the prediction mode 0 which is the vertical prediction, the value of pixel A is assigned to pixels a, e, i, and m; the value of pixel B is assigned to pixels b, f, j and n; the value of pixel C is assigned to pixels c, g, k, and o; and the value of pixel D is assigned to pixels d, h, l, and p.

In the intra prediction, there is no block to be referred to in accordance with the block position. In such a case, a value of "128" or the value of an adjacent pixel is set for performing the prediction.

For example, in a block positioned at the uppermost line in the frame, nine pixels from X to H can never be referred to, and thus the value "128" is used. In addition, if there are upper-left and upper blocks but no upper-right block is present, the value of pixel D is assigned to each of pixels E, F, G, and H.

Non-Patent Document 1: Sakae Okubo, Shinya Kadono, Yoshihiro Kikuchi, and Teruhiko Suzuki, Revised edition of "H.264/AVC TEXTBOOK", pp. 106-112, 259-262, 2006

Non-Patent Document 2: ITU-T Study Group16-Question 6/16: "Draft new Corrigendum 1 to H.264 "Advanced video coding for generic audiovisual services"", pp. 118-136, 2005

DISCLOSURE OF INVENTION

Problem to be Solved by the Invention

In conventional intra prediction, reference pixels used in prediction are limited to those adjacent to the encoding target block. It is obviously effective to use an object having a correlation as high as possible to the predicted object. For example, in general inter prediction, using a frame immediately before the encoding target frame is highly efficient.

Therefore, in the conventional intra prediction, reference pixels used in the prediction are limited to those adjacent to the encoding target block.

However, as an exception in the inter prediction, a higher efficiency may be obtained when referring to a frame which is earlier than the frame immediately before the encoding target frame. For example, such a case occurs when:

(i) an occlusion (e.g., a part which could not be viewed through the camera) occurs, and an appropriate reference target cannot be found using the frame immediately before the encoding target frame; or (ii) the target object is moving periodically, and the prediction error can be smaller if a frame other than the frame immediately before the encoding target frame is referred to.

A similar concept can be applied to the intra prediction. That is, generally, it is believed that a reference pixel positioned closest to the encoding target block has the highest correlation to the prediction target (i.e., the closer to the encoding target block, the higher the correlation is) in consideration of spatial correlation, and thus it is possible to reduce the prediction error.

However, as an exception, it is not always correct that the closer to the encoding target block, the smaller the prediction error is, and on the contrary, the prediction error may increase.

For example, the prediction error may increase when:

(i) there is an occlusion or noises at a position closest to the encoding target block;

(ii) a periodic signal such as a striped pattern appears; or (iii) the prediction error between the encoding target pixel and a reference pixel is very large because the reference pixel is a decoded image, and thus the closer to the encoding target block (which will be encoded) the reference pixel is, the larger the produced superimposed noise is.

Therefore, if the conventional technique is employed even in such cases, the prediction error increases and the compression efficiency cannot be improved in the intra prediction encoding.

In consideration of the above circumstances, an object of the present invention is to provided a novel video encoding technique for improving the compression efficiency of intra prediction encoding.

Means for Solving the Problem (1) Structure of the Video Encoding Apparatus of the Present Invention In order to achieve the above object, the video encoding apparatus of the present invention, which encodes a video image using intra prediction, includes (i) a setting device that sets candidates for reference pixels to pixels within a predetermined distance range measured from an encoding target block; (ii) a generating device that sequentially selects reference pixels used for the intra prediction of the encoding target block from among the reference pixel candidates set by the setting device while changing a distance condition from the encoding target block, and generates a predicted signal based on the reference pixels for each distance condition; (iii) a computing device that computes an encoding cost required for subjecting the encoding target block to intra prediction encoding using each predicted signal generated by the generating device; (iv) a determination device that finally determines reference pixels used for the intra prediction of the encoding target block based on each encoding cost computed by the computing device; and (v) an encoding device that encodes information which indicates the position of the reference pixels determined by the determination device.

In the above structure, the setting device may vary the distance range used for setting the reference pixel candidates in accordance with the value of a parameter which indicates the amount of quantization (e.g., a quantization step size or a quantization parameter). For example, when the quantization is rough, the entire image becomes blurred, and an increase in the prediction accuracy cannot be anticipated even by using distant pixels as reference pixels. Therefore, the setting device may set a relatively small distance range used for setting the reference pixel candidates. In contrast, when the quantization is fine, the entire image becomes sharp, and an increase in the prediction accuracy can be anticipated even by using distant pixels as reference pixels. Therefore, the setting device may set a relatively large distance range used for setting the reference pixel candidates.

In addition, when generating a predicted signal, it is possible to (i) sequentially apply prediction methods corresponding to a plurality of prediction modes to the selected reference pixels and generate a predicted signal for each prediction method; (ii) compute each encoding cost using each generated predicted signal; and (iii) encode the prediction mode of the predicted signal used for computing the encoding cost by which the reference pixels are determined.

The above-described devices can also be implemented by a computer program. Such a computer program may be provided by storing it in an appropriate computer-readable storage medium, or by means of a network, and can be installed and operate on a control device such as a CPU so as to implement the present invention.

(2) Structure of the Video Decoding Apparatus of the Present Invention

The video decoding apparatus of the present invention, which receives encoded data generated by a video encoding apparatus in accordance with the present invention, includes (i) an obtaining device that obtains reference target information, which indicates how distant reference pixels used in encoding are positioned from an encoding target block, by decoding encoded data of the reference target information; (ii) an acquiring device that obtains reference pixels used in intra prediction encoding of the encoding target block based on the reference target information obtained by the obtaining device; and (iii) a generating device that restores a predicted signal used in the intra prediction encoding of the encoding target block based on the reference pixels acquired by the acquiring device, and generates a decoded image signal using the predicted signal.

The above-described devices can also be implemented by a computer program. Such a computer program may be provided by storing it in an appropriate computer-readable storage medium, or by means of a network, and can be installed and operate on a control device such as a CPU so as to implement the present invention.

Effect of the Invention

In accordance with the present invention, efficient intra prediction can be applied to an image which includes an occlusion or noises, or an image in which signals having similar spatial frequencies periodically appear, where such images cannot be handled in conventional intra prediction. Therefore, it is possible to improve compression efficiency.

BRIEF DESCRIPTION OF THE DRAWINGS

FIG. 14 is a diagram explaining results of an experiment performed for verifying the effectiveness of the present invention.

REFERENCE SYMBOLS

Figure 1:
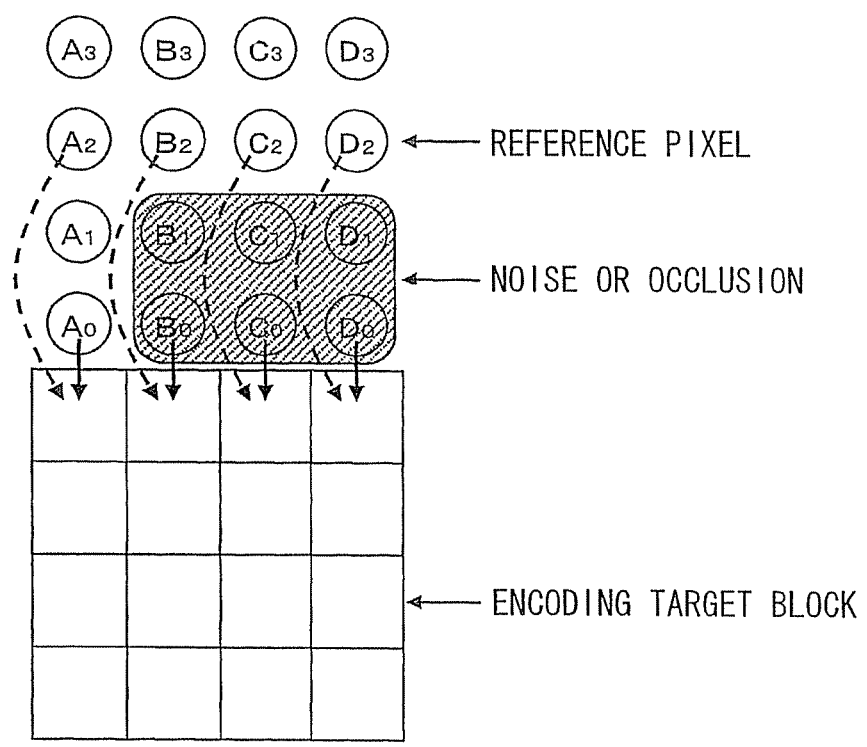
FIG. 1 is a diagram showing an example process in accordance with the present invention.

1 intra prediction encoding apparatus
10 cost computation loop part
11 reference target information encoder
12 intra encoder
100 reference pixel candidate setting unit
101 reference pixel candidate information storage unit
102 reference target information selector
103 mode selector
104 intra prediction unit
105 cost determination unit
106 minimum cost storage unit
107 minimum cost initializing unit
108 loop end determination unit

BEST MODE FOR CARRYING OUT THE INVENTION

In the video encoding apparatus of the present invention, after pixels within a predetermined distance range measured from the encoding target block are set as candidates for reference pixels, the reference pixels used for the intra prediction of the encoding target block are successively selected from among the candidates while changing the distance condition measured from the encoding target block. The predicted signal is generated based on the selected reference pixels.

For example, a set of pixels which form a reference line on the upper side of the encoding target block; a set of pixels which form a reference line on the left side of the encoding target block; and the pixel at the intersection of the two reference lines are selected as the reference pixels. The predicted signal is generated based on the selected reference pixels. In another example, the reference pixels are selected by setting any one of the above two reference lines as the fixed closest line to the encoding target block while the position of the other line is variable. The predicted signal is also generated based on the selected reference pixels.

Then the encoding cost required when the encoding target block is subjected to the intra prediction encoding using each generated predicted signal is computed. Based on the computed encoding cost, the reference pixels used for the intra prediction of the encoding target block are finally determined, and information which indicates the position of the determined reference pixels is encoded.

In the video decoding apparatus of the present invention, which receives encoded data generated by the video encoding apparatus of the present invention, obtains reference target information which indicates how distant the reference pixels used in the encoding are positioned from the encoding target block by decoding encoded data of the reference target information. Based on the obtained reference target information, the reference pixels used in the intra prediction encoding of the encoding target block are obtained. Then based on the obtained reference pixels, the predicted signal used in the intra prediction encoding of the encoding target block is restored, and a decoded image signal is generated using the restored signal.

As described above, in the present invention, all already-encoded pixels within a predetermined distance range, which include pixels other then pixels adjacent and closest to the encoding target block, can be used, thereby implementing intra prediction having reduced prediction error.

Therefore, as understood by FIG. 1, even when the pixels adjacent and closest to the encoding target block have an occlusion or noises, in accordance with the present invention using distant pixels which can reduce the prediction error, an increase in the intra prediction efficiency can be anticipated. In FIG. 1, the vertical prediction mode is assumed, and the solid lines indicate the conventional prediction while the dashed lines indicate prediction to which the present invention is applied.

Figure 2:
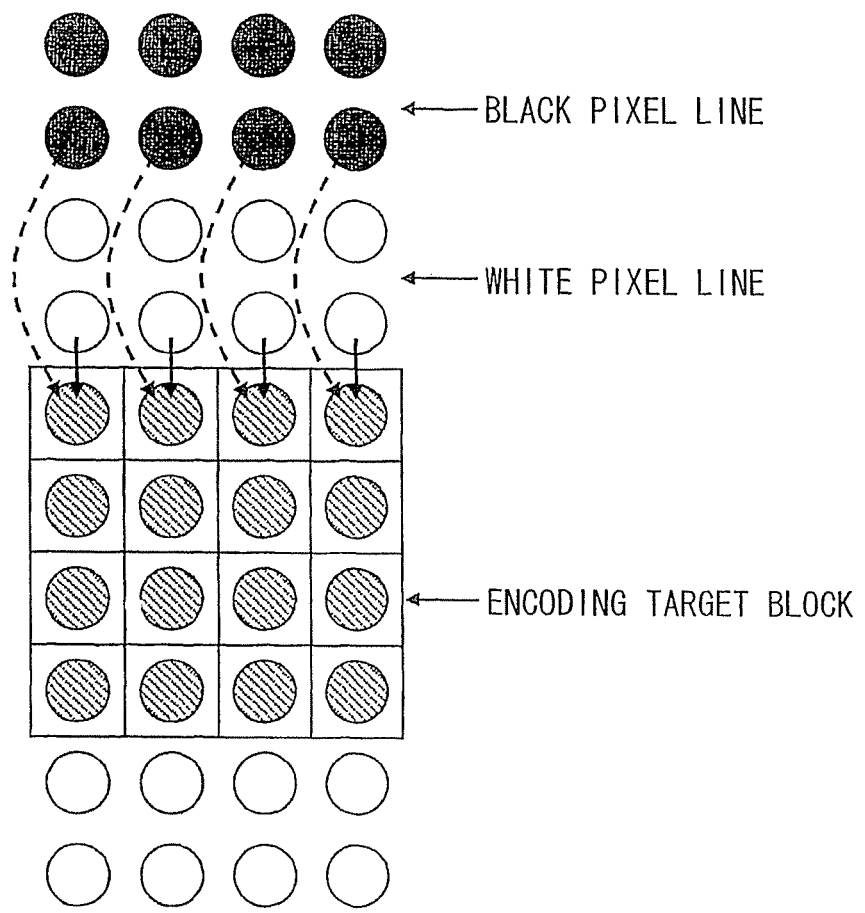
FIG. 2 is a diagram showing another example process in accordance with the present invention.

Additionally, as shown in FIG. 2, also when the image signal has characteristics in which black pixel lines and white pixel lines repeatedly appear one after another, in accordance with the present invention using distant pixels which can reduce the prediction error, an improvement in the intra prediction efficiency can be anticipated.

In FIG. 2, the vertical prediction mode is assumed, and the solid lines indicate the conventional prediction while the dashed lines indicate prediction to which the present invention is applied.

As explained above, in the conventional intra prediction, the possible reference position is limited to that closest to the encoding target block. Therefore, even if the prediction error increases, the conventional intra prediction cannot suppress the increase.

In contrast, in the present invention, the range of the reference position is expanded so that pixels which can further reduce the prediction error can be selected. Accordingly, it is possible to implement efficient intra prediction.

Below, the present invention will be explained in detail in accordance with specific embodiments.

Figure 3:
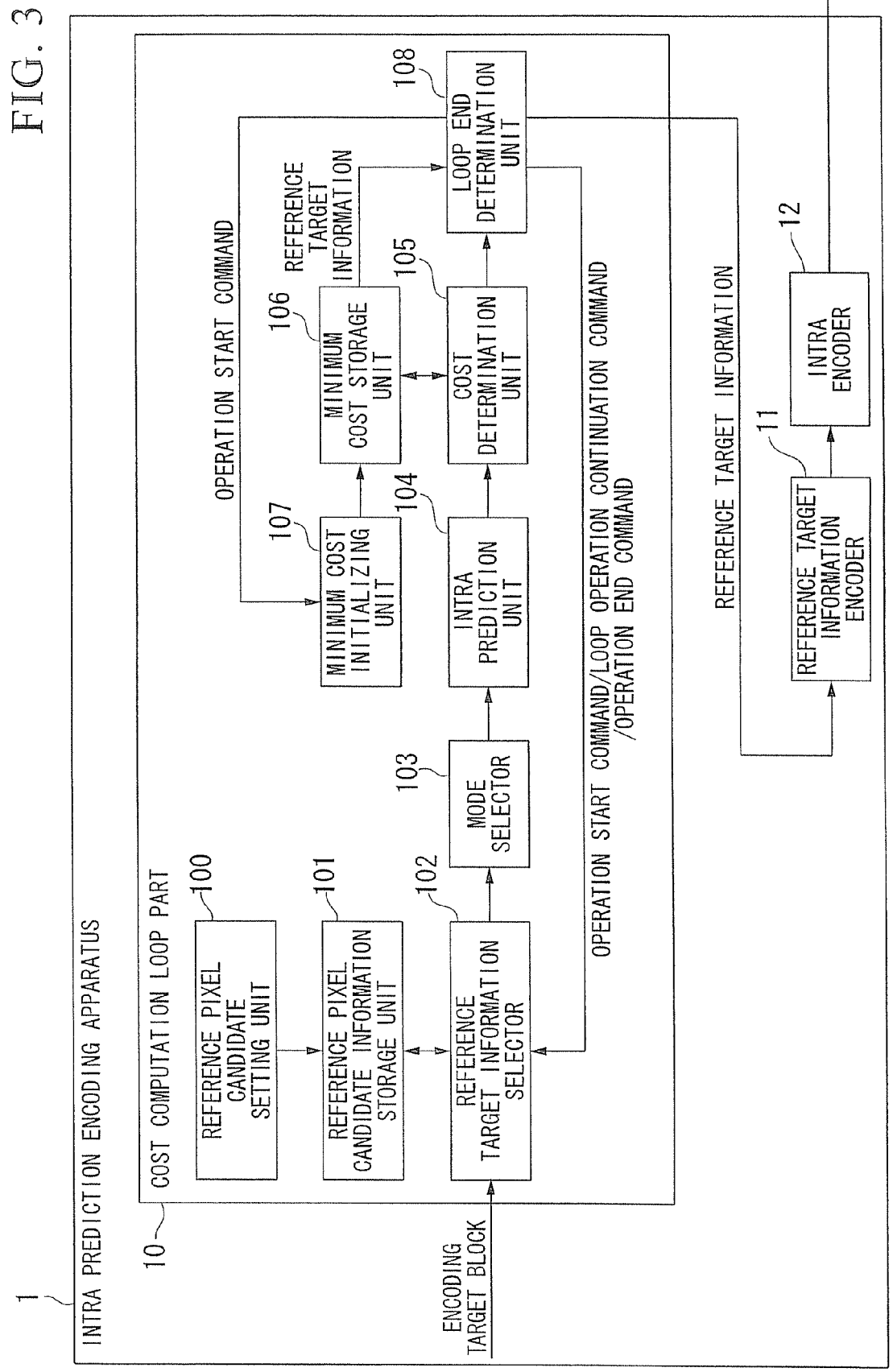
FIG. 3 is a diagram showing an embodiment of the intra prediction encoding apparatus of the present invention.

FIG. 3 shows the structure of an intra prediction encoding apparatus 1 as an embodiment of the present invention.

Figure 4:
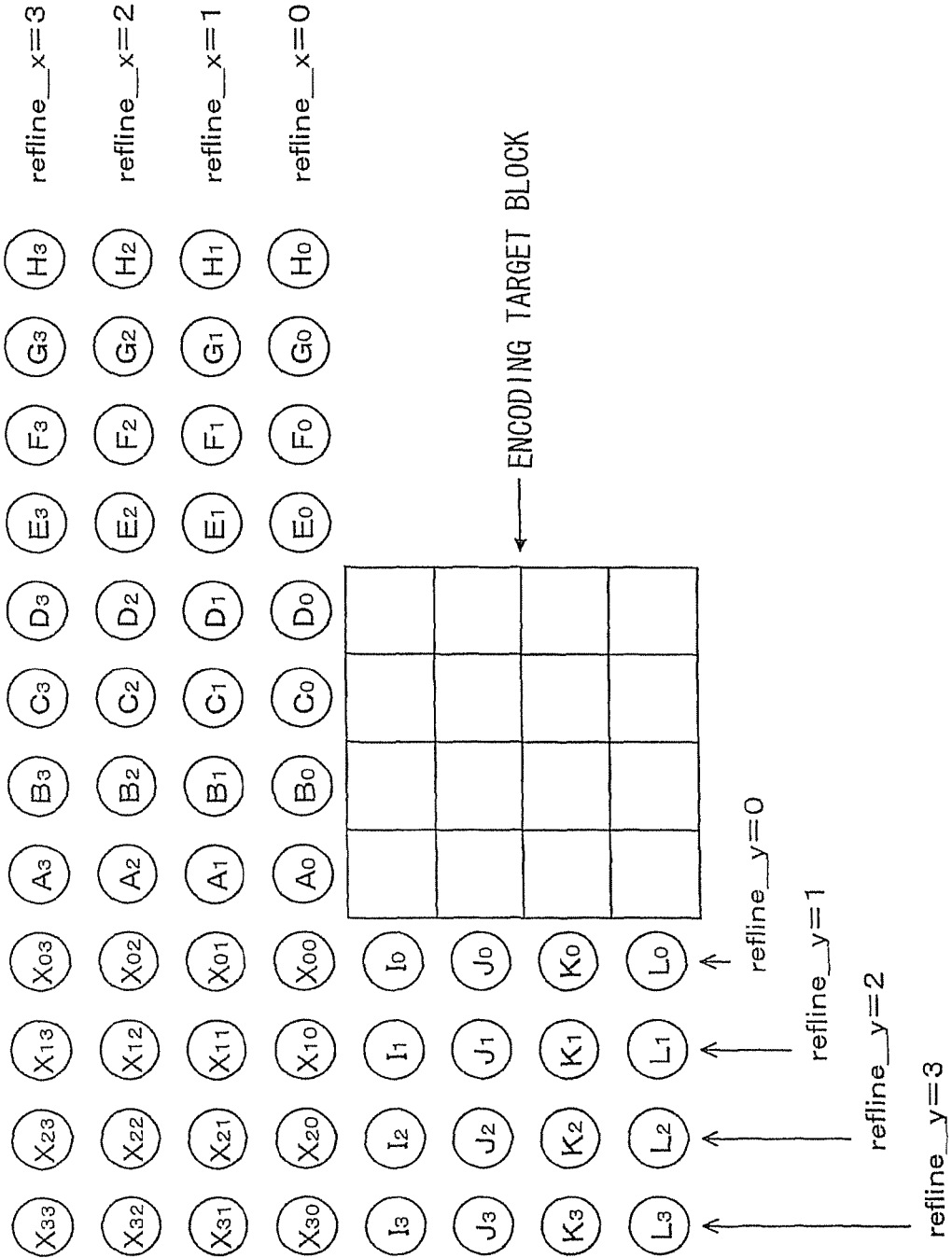
FIG. 4 is a diagram explaining reference pixels relating to the embodiment.

As shown in FIG. 4, in the intra prediction encoding apparatus 1, a set of lines on the upper side of the encoding target block, which include already-encoded pixels, is defined as refline_x ($0 \leq$ refline_x<m), and a set of pixel lines on the left side of the encoding target block is defined as refline_y ($0 \leq$ refline_y<n). The intra prediction is performed by acquiring reference pixels included in the sets, so that intra prediction can be performed by setting reference pixels to more distant pixels than those which should satisfy "refline_x=refline_y=0" in conventional techniques.

In order to implement the above-described intra prediction, the intra prediction encoding apparatus 1 in accordance with the present invention includes a cost computation loop part 10 which repeatedly performs intra prediction based on reference pixels defined in accordance with each possible set of values of refline_x and refline_y so as to compute a rate-distortion cost, and determines the values of refline_x and refline_y which provide the reference pixels for obtaining the minimum rate-distortion cost; a reference target information encoder 11 for encoding the values of refline_x and refline_y determined by the cost computation loop part 10; and an intra encoder 12 for generating a predicted signal by using the values of refline_x and refline_y determined by the cost computation loop part 10 and performing the intra encoding.

In order to perform the above operation, the cost computation loop part 10 includes a reference pixel candidate setting unit 100 for setting ranges of possible values of refline_x and refine_y; a reference pixel candidate information storage unit 101 for storing the information set by the reference pixel candidate setting unit 100; a reference target information selector 102 for selecting the values of refline_x and refline_y as reference target information based on the information stored in the reference pixel candidate information storage unit 101; a mode selector 103 for selecting the prediction mode of intra encoding; an intra prediction unit 104 for generating a predicted signal for the prediction mode selected by the mode selector 103, by using a reference signal determined by the reference target information selected by the reference target information selector 102; a cost determination unit 105 for (i) computing a rate-distortion cost based on the predicted signal generated by the intra prediction unit 104, (ii) comparing the computed cost with the already-computed minimum rate-distortion cost stored in a minimum cost storage unit 106 (which also stores the reference target information which provided the minimum cost value), and (iii) updating the minimum rate-distortion cost stored in the minimum cost storage unit 106 when the currently-computed cost value is smaller; a minimum cost initializing unit 107 for storing a large initial value into the minimum cost storage unit 106 at the starting of the relevant operation; and a loop end determination unit 108 for determining whether or not the operation loop for the reference target information and the prediction mode has ended, where if the loop has not yet ended, the determination unit 108 commands the reference target information selector 102 to continue the loop operation, while if the loop has ended, the determination unit 108 transfers the reference target information, which provided the minimum rate-distortion cost stored in the minimum cost storage unit 106, to the reference target information encoder 11.

Figure 5:
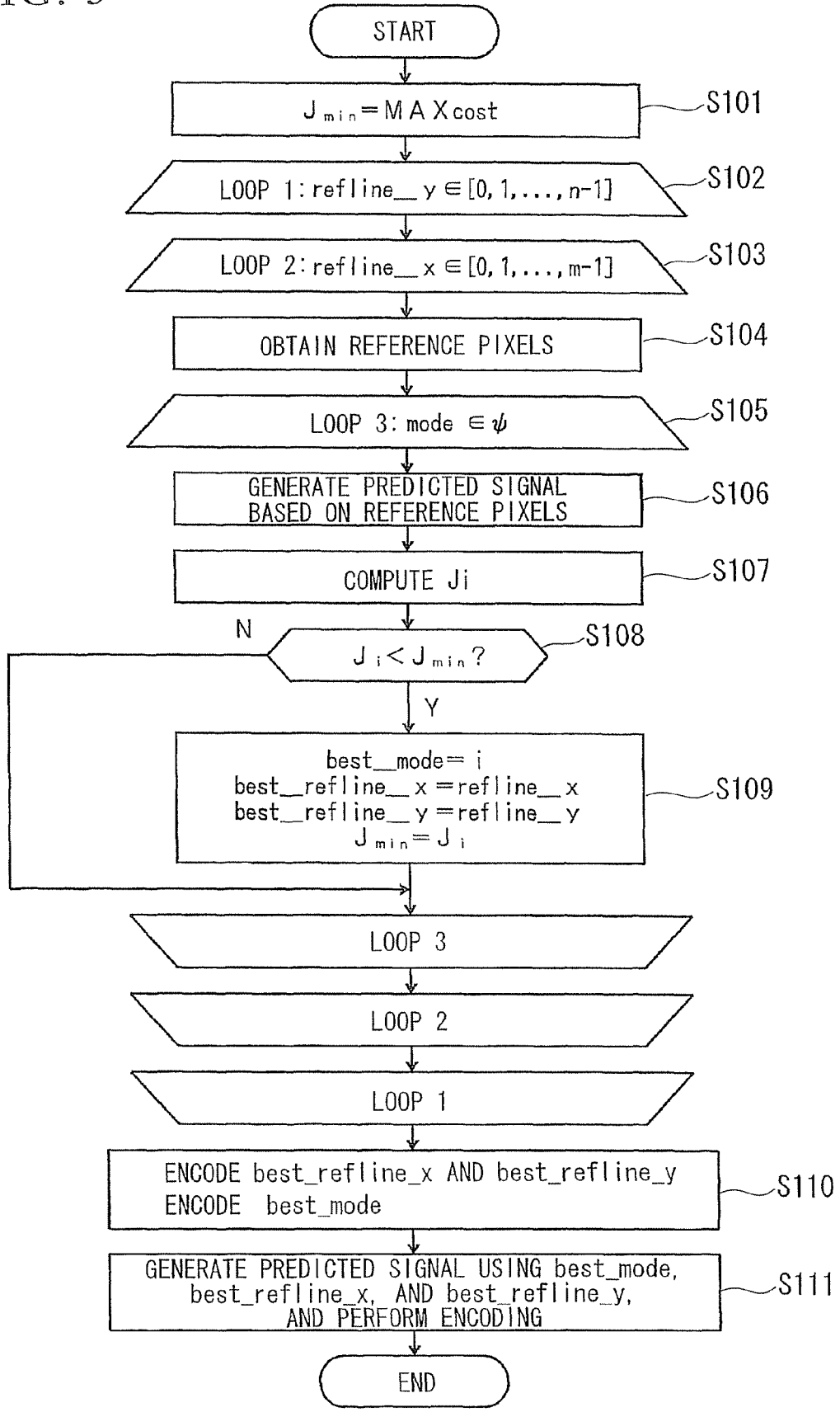
FIG. 5 is a flowchart executed by the intra prediction encoding apparatus of the embodiment.

FIG. 5 shows an example of the flowchart executed by the above-configured intra prediction encoding apparatus 1 of the present embodiment.

In accordance with the flowchart, the intra prediction encoding process performed by the intra prediction encoding apparatus 1 will be explained in detail.

Before the execution of the flowchart in FIG. 5, the intra prediction encoding apparatus 1 of the present embodiment defines (i) a set of lines on the upper side of the encoding target block, which include already-encoded pixels, as refline_x ($0 \leq$ refline_x<m), and (ii) a set of pixel lines on the left side of the encoding target block, as refline_y ($0 \leq$ refline_y<n) (see FIG. 4). Here, the numbers 0, 1, 2, . . . are assigned to the relevant lines from the closest to the encoding target block.

FIG. 4 shows a specific example of a definition of refline_x and refline_y for a 4×4 block, that is, m=n=4.

However, "m=n=4" is not a limiting condition, and it is not always necessary that m=n. The larger the numbers (values) m and n, the larger the number of candidates for the relevant prediction, which can reduce the prediction error (i.e., improve the encoding efficiency). However, if the reference pixels are too distant, the spatial correlation between the pixels and the encoding target degrades, and thus extremely large values should not be set as m and n. Additionally, as the information of "refline" is encoded, if the numbers m and n increase, the amount of data of the reference target information (which indicates how distant the reference pixels are from the encoding target block) may increase.

The numbers m and n may be determined based on the value of a parameter (e.g., a quantization parameter) which indicates the amount of quantization.

When performing the intra prediction encoding in accordance with the flowchart of FIG. 5 after the definition of refline_x and refline_y, the intra prediction encoding apparatus 1 of the present embodiment first initializes a variable $J_{min}$ (in which the minimum value of "rate-distortion cost J" is stored) at a sufficiently large value MAXcost (see step S101).

The rate-distortion cost J may be defined as:

$$J = SSD + \lambda \times R$$

where SSD indicates a sum of squared absolute values of the prediction error; $\lambda$ is the Lagrange multiplier; and R indicates the amount of code generated when encoding the encoding target block using the set prediction mode.

For more information about the amount R of generated code, the video encoding is basically performed in a sequential flow of prediction, transformation, quantization, and entropy encoding.

The amount R of generated code indicates the amount of code generated by actual encoding. In the present case, a predicted image is generated using a prediction method in accordance with the present invention; the difference between the predicted image and the original image is computed; a corresponding residual signal is subjected to orthogonal transformation by means of DCT transform with an integral accuracy; the transformed signal is subjected to quantization; and the quantized signal is subjected to entropy encoding so as to obtain binary bit data (0 and 1). Here, the number of binary bits corresponds to the amount R of generated code In the next step S102, "loop 1" for designating the position of refline_y starts, where refline_y is set to an initial value of 0.

In the next step S103, "loop 2" for designating the position of refline_x starts, where refline_x is set to an initial value of 0.

In the next step S104, reference pixels, which are uniquely determined by refline_x and refline_y, are obtained.

That is, in the example definition of FIG. 4, reference pixels from X to L (i.e., X, A to H, and I to L), which are uniquely determined by refline_x and refline_y, are obtained. If refline_x=0 and refline_y=0, then it is determined that $X=X_{00}, A=A_0, B=B_0 \ldots, H=H_0, I=I_0, J=J_0, K=K_0,$ and $L=L_0$.

In cases other than "refline_x=0 and refline_y=0", the pixel at the intersection of refline_x and refline_y is referred to as X. In an example of FIG. 6, if refline_x=2 and refline_y=1, then $X=X_{12}$ ($X_{02}, X_{11}, X_{10}, X_{13}, X_{22},$ and $X_{32}$ are not referred to).

In the next step S105, "loop 3" for designating the prediction mode assigned to the encoding target block starts. Here, possible prediction modes for the encoding target block are determined depending on the position thereof in the relevant image. Therefore, $\Psi$ is defined as a set of all prediction modes which can be assigned to the encoding target block.

Additionally, a variable "mode" for storing the prediction mode number is initialized at "i" (which is the minimum prediction mode number among the possible prediction modes).

In the next step S106, a predicted signal is generated based on the obtained reference pixels and the prediction mode selected in loop 3, by using a conventional prediction mode generating method.

Figure 6:
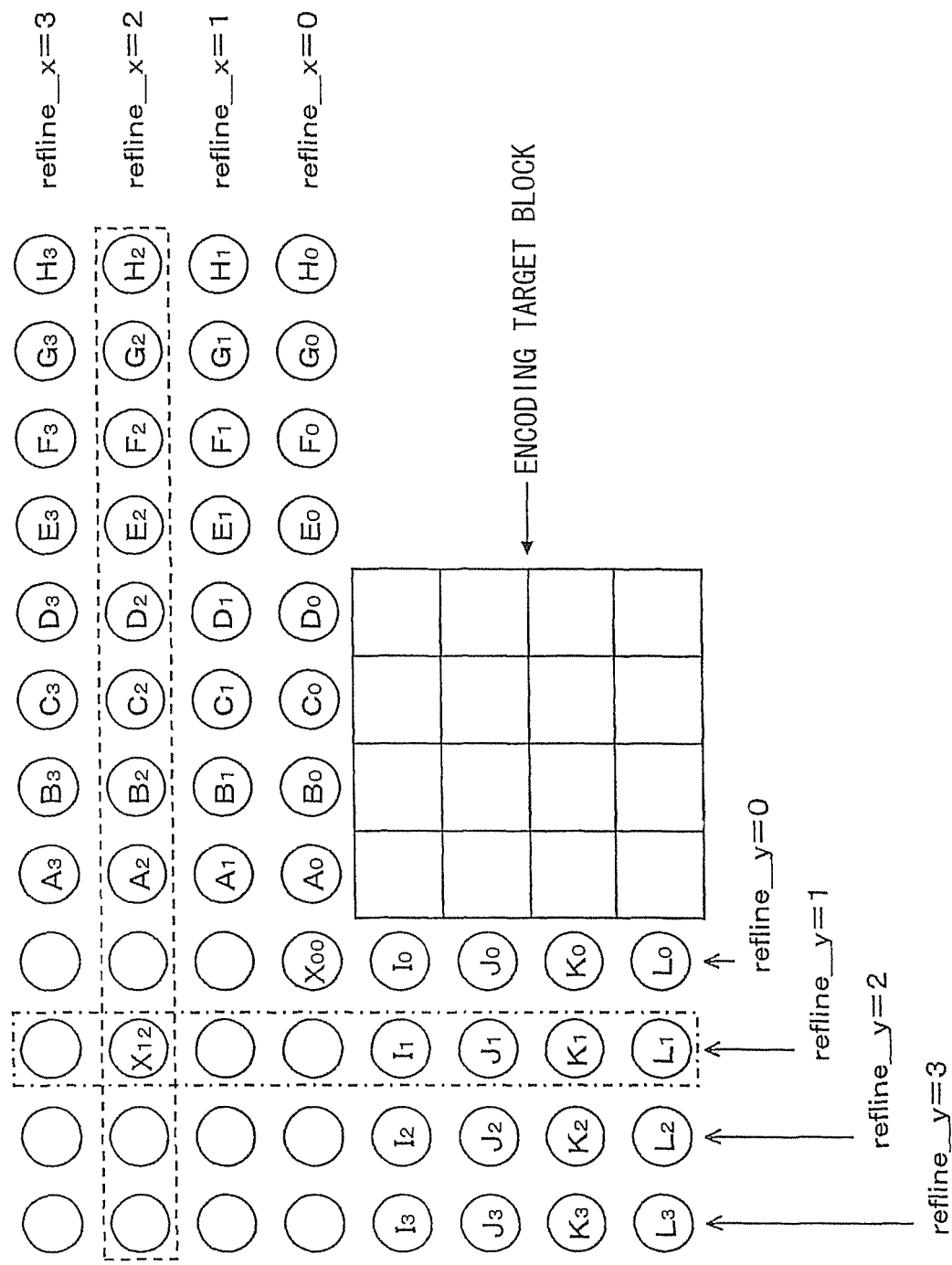
FIG. 6 is a diagram explaining reference pixels relating to the embodiment.
Figure 7:
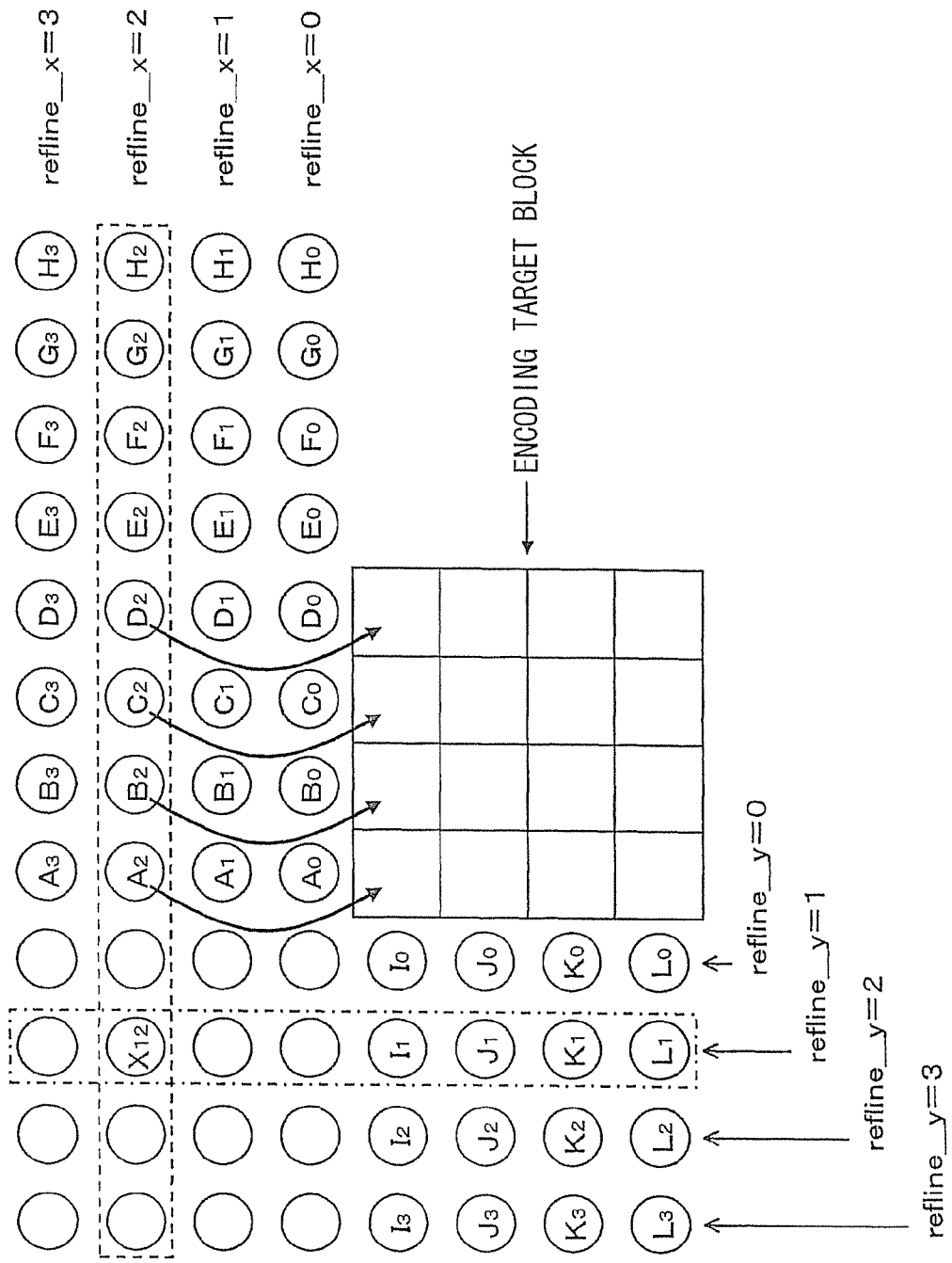
FIG. 7 is a diagram explaining an example of intra prediction performed in the embodiment.

For example, in the case shown in FIG. 6, while the reference pixels are obtained in accordance with refline_x=2 and refline_y=1, if "prediction mode 0" is selected in loop 3, then as shown in FIG. 7, a vertical prediction using $A_2, B_2, C_2,$ and $D_2$ is performed so as to generate a predicted signal of the encoding target block.

In the next step S107, rate-distortion cost $J_i$ for mode=i is computed using the generated predicted signal by a known computation method as explained before.

In the next step S108, it is determined whether or not "$J_i < J_{min}$" is satisfied, so as to determine whether rate-distortion cost $J_i$ has the minimum value among the already-computed relevant cost values.

In accordance with the determination in step S108, if $J_i < J_{min}$, then the operation proceeds to step S109. In step S109, the value of variable best_mode is updated using the current prediction mode i; the value of variable best_refline_x is updated using the current refline_x; the value of variable best_refline_y is updated using the current refline_y; and the value of variable $J_{min}$ is updated using the current $J_i$.

In contrast, if "$J_i < J_{min}$" is not satisfied in the determination in step S108, then the process in step S109 is omitted.

The above-described cost computation is repeatedly performed for all possible prediction modes in loop 3. When loop 3 has been completed, then loop 2 is repeatedly executed while the value of refline_x is incremented by 1 within the range of refline_x<m. When loop 2 has been completed, then loop 1 is repeatedly executed while the value of refline_y is incremented by 1 within the range of refline_y<n.

By executing the above three loop structures, best_mode, best_refline_x, and best_refline_y for providing the minimum rate-distortion cost are obtained.

Then, in step S110, best_refline_x and best_refline_y as reference target information are encoded, and best_mode is also encoded. A known method such as arithmetic encoding is used here. The encoded information may be inserted into a header.

In the next step S111, a predicted signal is generated using the obtained best_mode, best_refline_x, and best_refline_y, and the encoding target block is encoded.

Therefore, in the intra prediction encoding apparatus 1 of the present embodiment, when performing the intra prediction, more distant pixels can be referred to than those which must satisfy "refline_x=refline_y=0" in conventional techniques.

In accordance with the intra prediction encoding apparatus 1 of the present embodiment, efficient intra prediction can be applied to an image which includes an occlusion or noises, or an image in which signals having similar spatial frequencies periodically appear, where such images cannot be handled in conventional intra prediction. Therefore, it is possible to improve compression efficiency.

Figure 8:
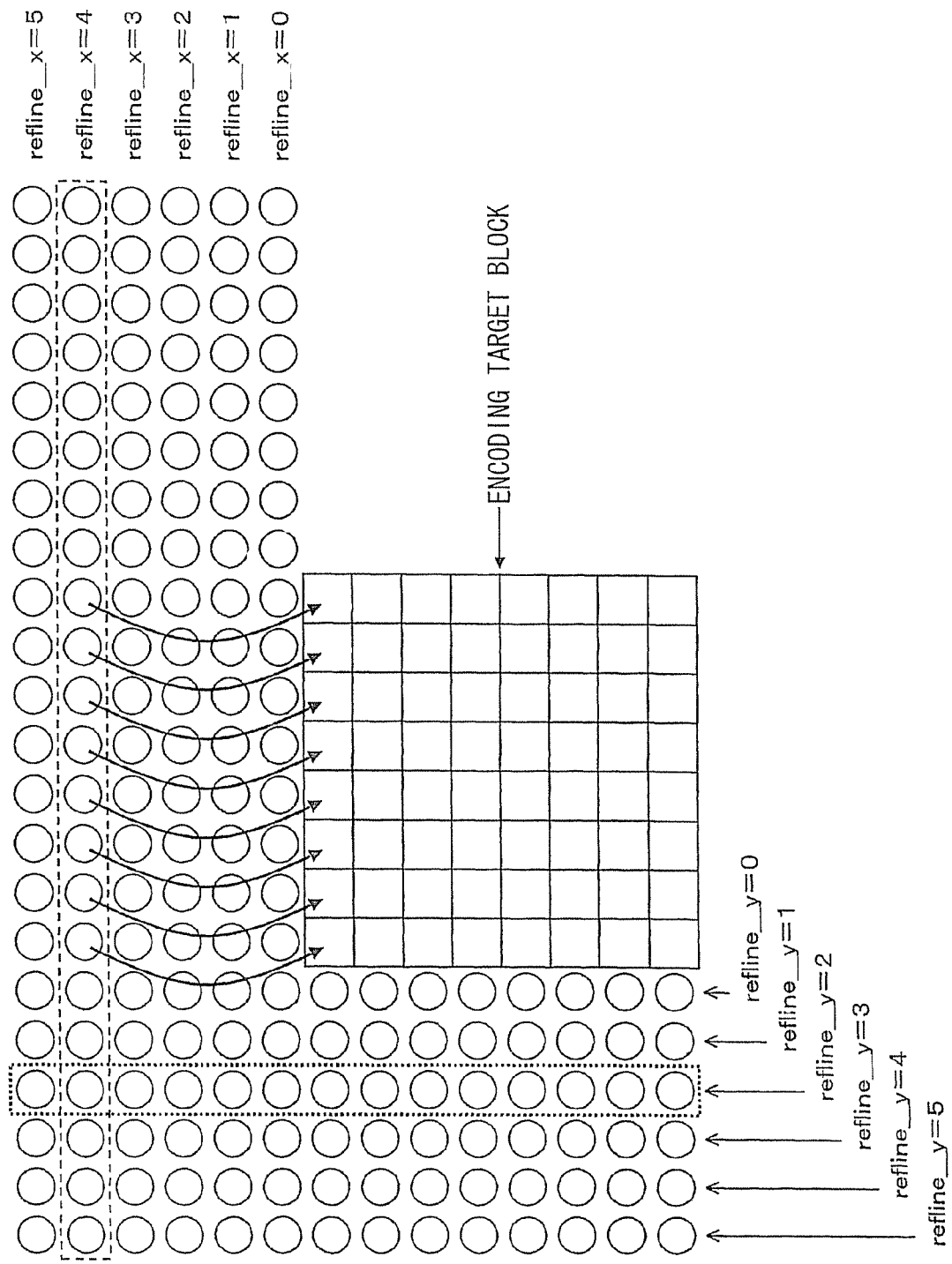
FIG. 8 is a diagram explaining an example of intra prediction which can be performed in the embodiment.

In the above explanation, a 4×4 block is targeted. However, the present invention can also be directly applied to any block (e.g., an 8×8 block shown in FIG. 8) other than the 4×4 block. In addition, the present invention can be directly applied to, not only the luminance signal but also the chrominance signal.

Figure 9:
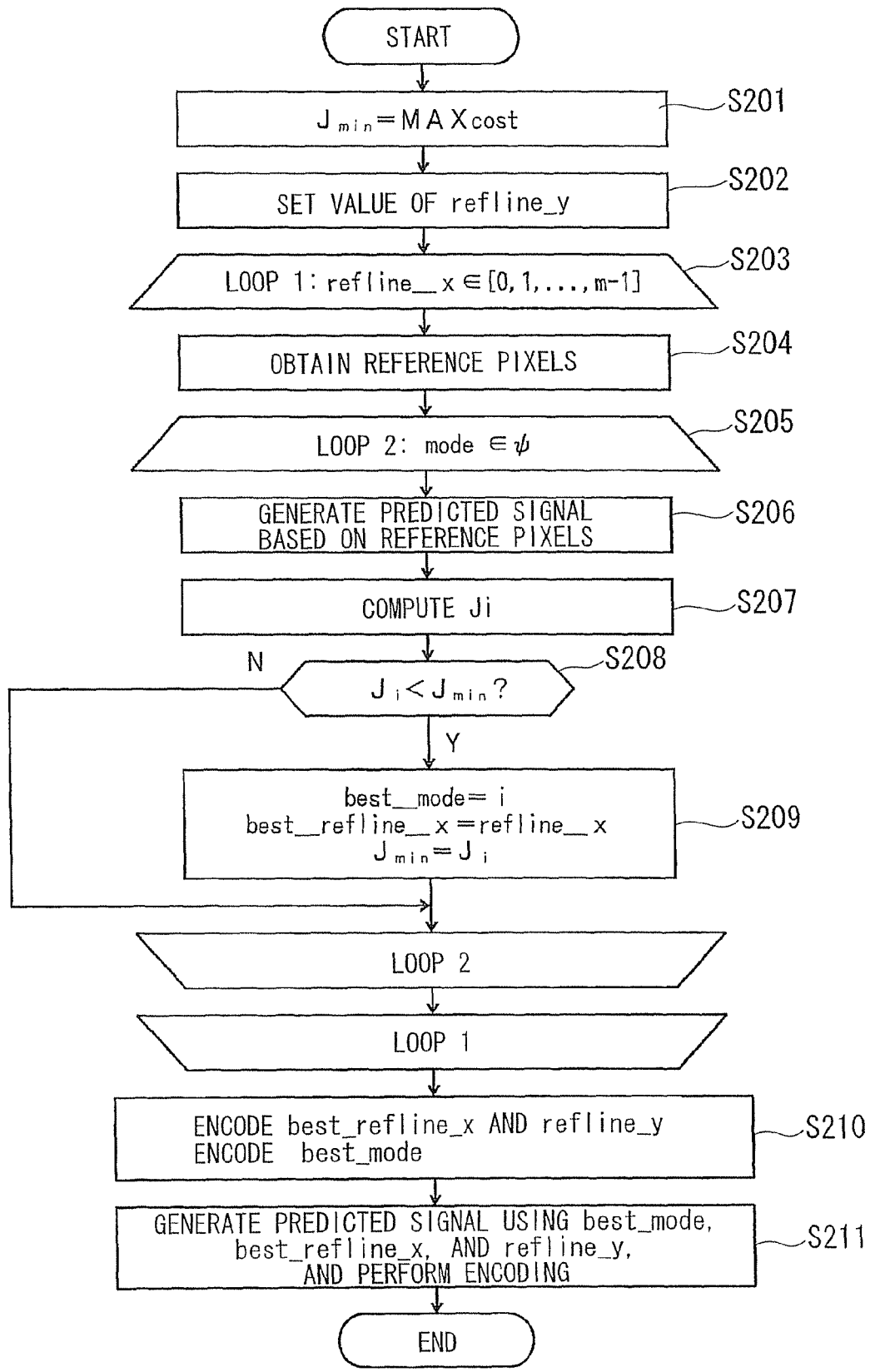
FIG. 9 is a flowchart which can be executed by the intra prediction encoding apparatus of the embodiment.

FIG. 9 shows another example of the flowchart executed by the intra prediction encoding apparatus 1 of the present embodiment.

When executing this flowchart, the intra prediction encoding apparatus 1 has a distinctive feature of fastening the position of refline_y, in comparison with the flowchart of FIG. 5.

That is, when performing the intra prediction encoding in accordance with the flowchart of FIG. 9, the intra prediction encoding apparatus 1 first initializes a variable $J_{min}$ (in which the minimum value of "rate-distortion cost J" is stored) at a sufficiently large value MAXcost (see step S201), and then sets refline_y to a fixed value (see step S202).

In the next step S203, "loop 1" for designating the position of refline_x starts, where refline_x is set to an initial value of 0. In the next step S204, reference pixels, which are uniquely determined by refline_x and refline_y, are obtained.

In the next step S205, "loop 2" for designating the prediction mode assigned to the encoding target block starts, and a variable "mode" for storing the prediction mode number is initialized at "i" (which is the minimum prediction mode number among the possible prediction modes).

In the next step S206, a predicted signal is generated based on the obtained reference pixels and the prediction mode selected in loop 2.

In the next step S207, rate-distortion cost $J_i$ for mode=i is computed using the generated predicted signal. In the next step S208, it is determined whether or not "$J_i < J_{min}$" is satisfied, so as to determine whether rate-distortion cost $J_i$ has the minimum value among the already-computed relevant cost values.

In accordance with the determination in step S208, if $J_i < J_{min}$, then the operation proceeds to step S209. In step S209, the value of variable best_mode is updated using the current prediction mode i; the value of variable best_refline_x is updated using the current refline_x; and the value of variable $J_{min}$ is updated using the current $J_i$.

In contrast, if "$J_i < J_{min}$" is not satisfied in the determination in step S208, then the process in step S209 is omitted.

The above-described cost computation is repeatedly performed for all possible prediction modes in loop 2. When loop 2 has been completed, then loop 1 is repeatedly executed while the value of refline_x is incremented by 1 within the range of refline_x<m.

By executing the above two loop structures, best_mode and best_refline_x for providing the minimum rate-distortion cost are obtained.

Then, in step S210, best_refline_x and refline_y as reference target information are encoded, and best_mode is also encoded.

In the next step S211, a predicted signal is generated using the obtained best_mode and best_refline_x, and refline_y having the fixed value, and the encoding target block is encoded.

Figure 10:
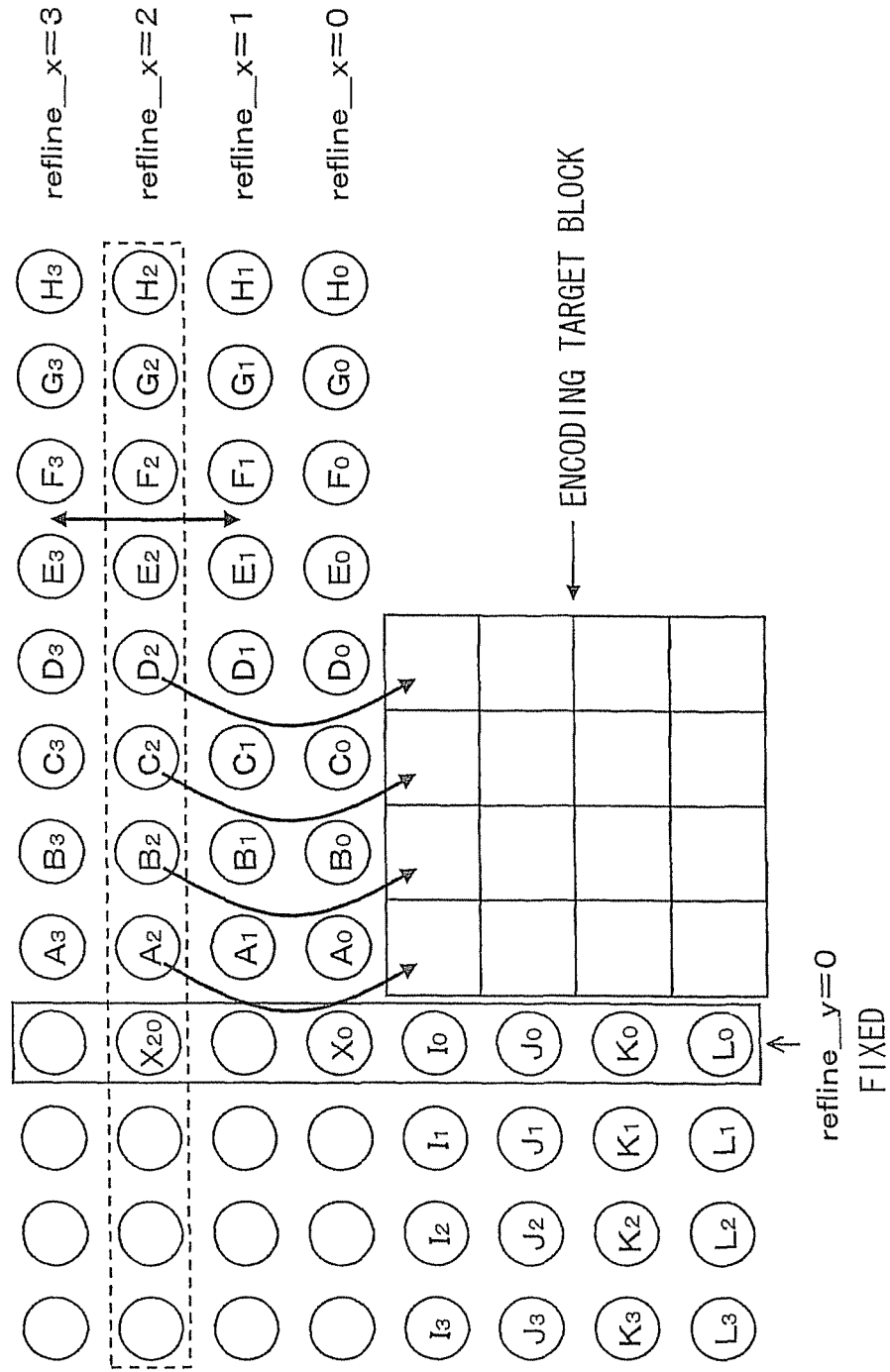
FIG. 10 is a diagram explaining intra prediction in accordance with the flowchart of FIG. 9.

That is, when performing the intra prediction encoding in accordance with the flowchart of FIG. 9, the intra prediction encoding apparatus 1 fixes the value of refline_y while moves the reference line of refline_x, so that intra prediction is performed as shown in an example of FIG. 10.

In the flowchart, the value of refline_y is fixed. However, the value of refline_x may be fixed instead. In such a case, the intra prediction encoding process is performed in accordance with a flowchart shown in FIG. 11.

Figure 11:
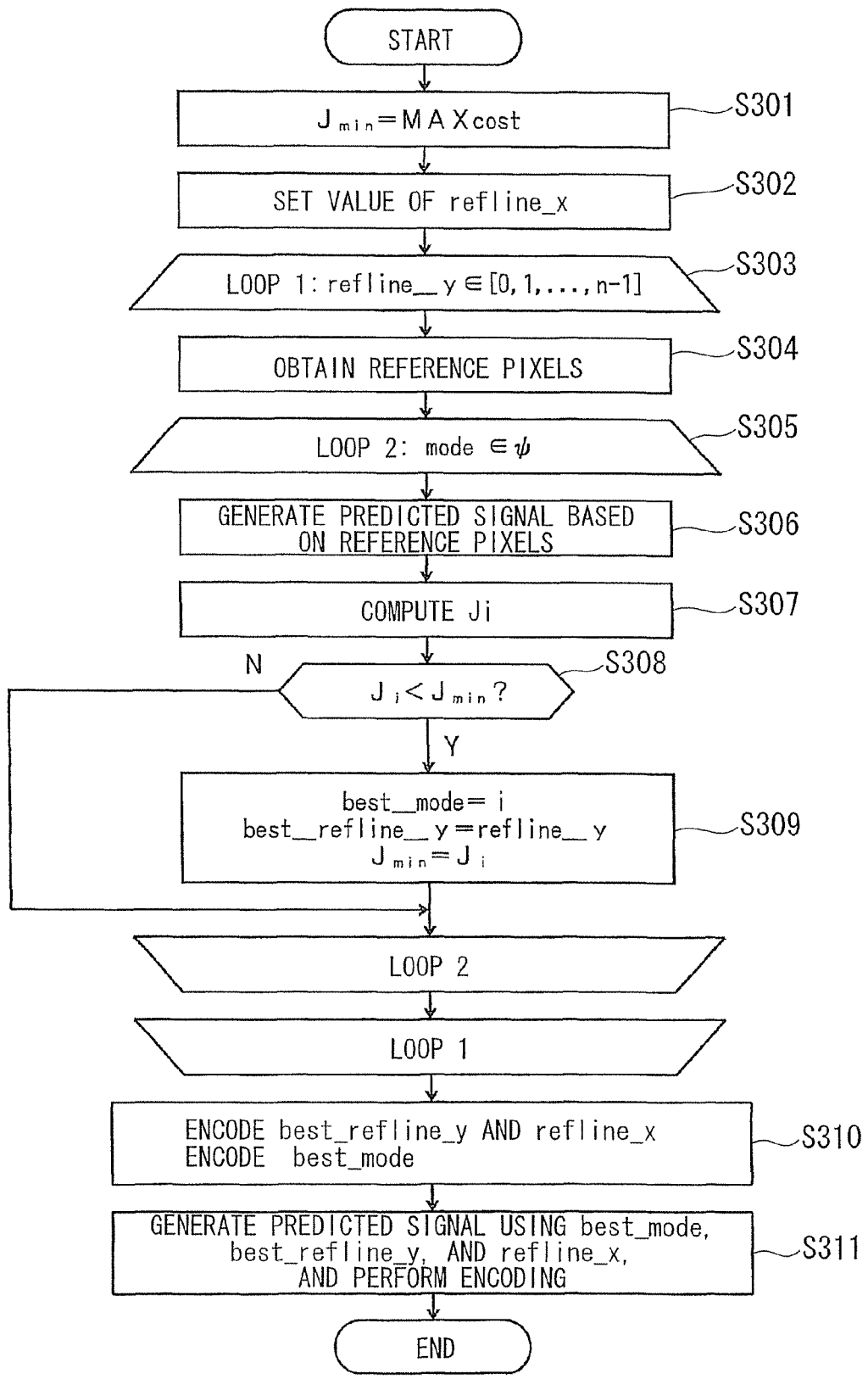
FIG. 11 is a flowchart which can be executed by the intra prediction encoding apparatus of the embodiment.

When performing the intra prediction encoding process in accordance with the flowchart in FIG. 9 or 11, the number of loop execution times for computing rate-distortion cost $J_i$ is reduced, so that it is effective for high-speed processing.

Below, an intra prediction encoded-data decoding apparatus for decoding encoded data generated by the intra prediction encoding apparatus 1 of the present embodiment will be explained.

Figure 12:
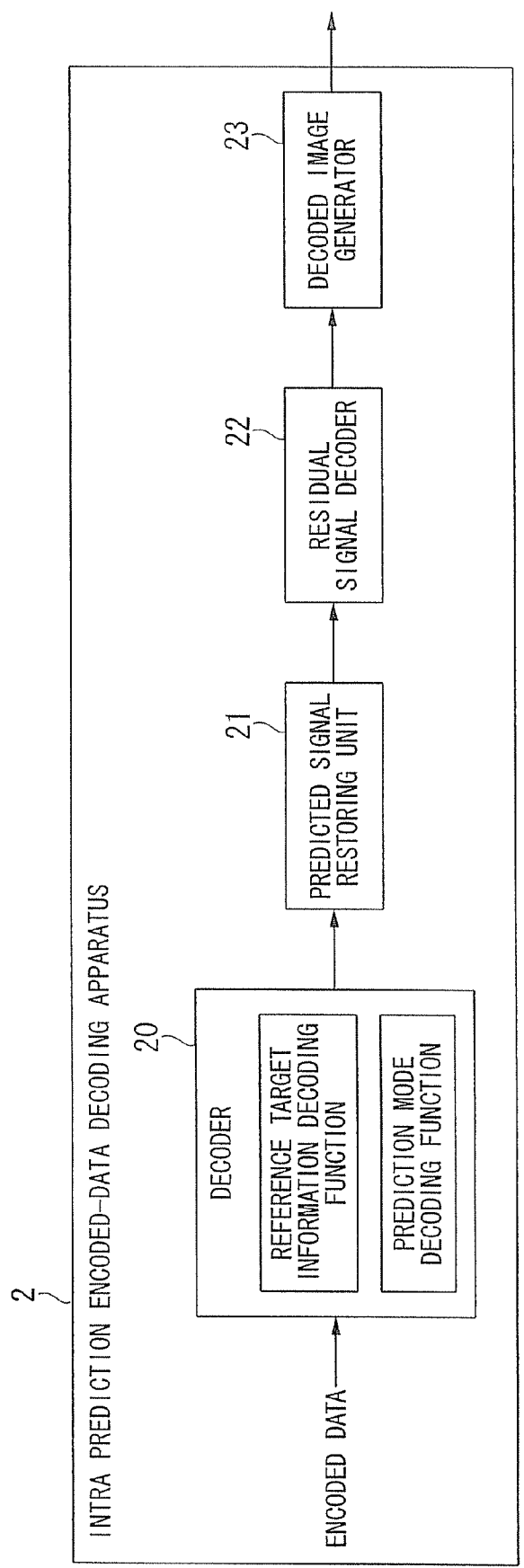
FIG. 12 is a diagram showing an intra prediction encoded-data decoding apparatus as an embodiment of the present invention.

FIG. 12 shows the structure of an intra prediction encoded-data decoding apparatus 2 as an embodiment of the present invention, which decodes encoded data generated by the intra prediction encoding apparatus 1 of the above embodiment.

In order to decode the encoded data generated by the intra prediction encoding apparatus 1, the intra prediction encoded-data decoding apparatus 2 has a decoder 20 for decoding input encoded data of the reference target information and the prediction mode (best_mode); a predicted signal restoring unit 21 for restoring a predicted signal based on the decoded reference target information and prediction mode; a residual signal decoder 22 for decoding a residual signal by decoding input encoded data; and a decoded image generator 23 for generating a decoded image based on the predicted signal restored by the predicted signal restoring unit 21 and the residual signal decoded by the residual signal decoder 22.

Figure 13:
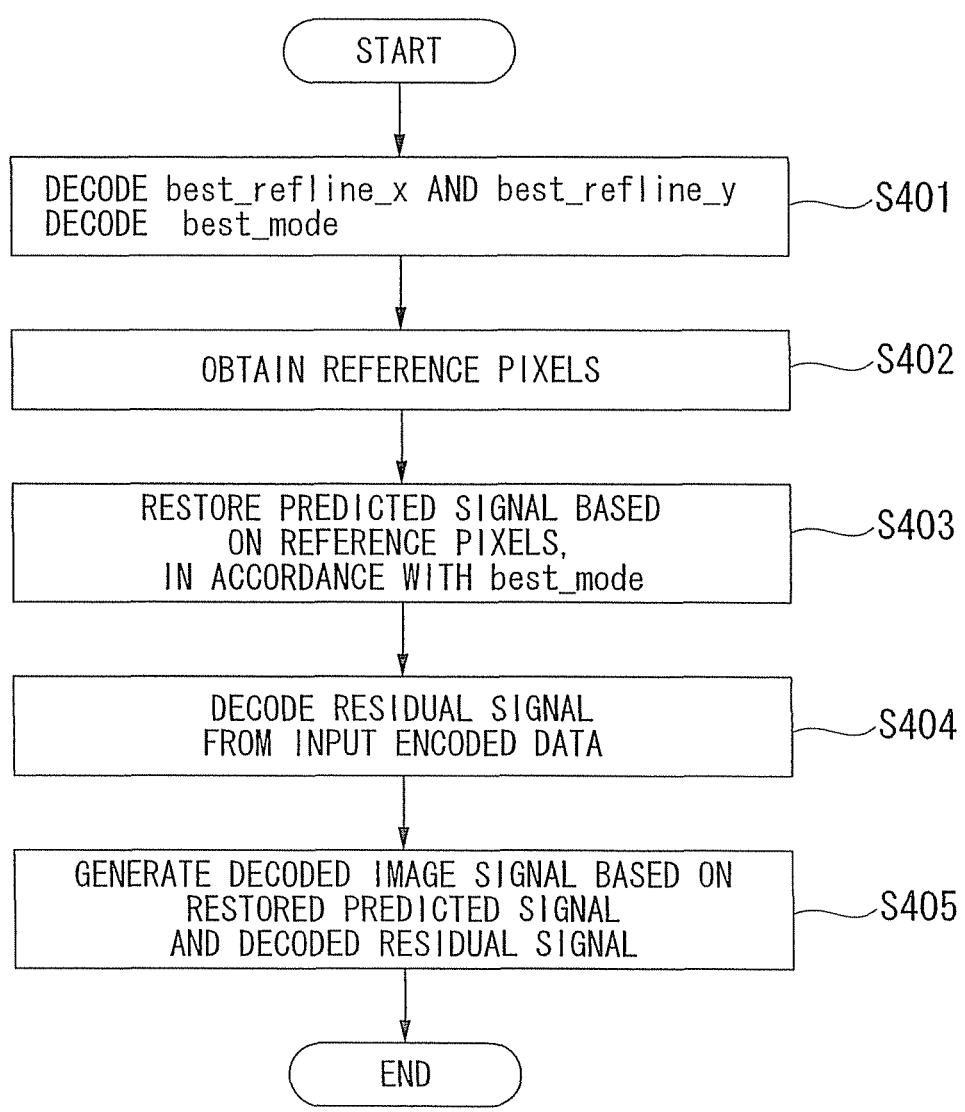
FIG. 13 is a flowchart executed by the intra prediction encoded-data decoding apparatus of the embodiment.

FIG. 13 shows an example of the flowchart executed by the intra prediction encoded-data decoding apparatus 2.

In accordance with the flowchart, the intra prediction encoded-data decoding process performed by the intra prediction encoded-data decoding apparatus 2 will be explained in detail.

When decoding encoded data generated by the intra prediction encoding apparatus 1 in accordance with the flowchart of FIG. 5, the intra prediction encoded-data decoding apparatus 2 of the present embodiment first decodes input encoded data of best_refline_x and best_refline_y, and also decodes input encoded data of best_mode (see step S401 of the flowchart in FIG. 13).

In the next step S402, reference pixels are obtained based on the decoded values of best_refline_x and best_refline_y.

In the next step S403, a predicted signal is restored based on the obtained reference pixels, in accordance with the decoded best_mode.

In the next step S404, a residual signal is decoded based on input encoded data, by performing inverse quantization and inverse transformation.

In the next step S405, the restored predicted signal and the decoded residual signal are added to each other, and a decoded image signal is generated by means of clipping.

In accordance with the above operation, the intra prediction encoded-data decoding apparatus 2 of the present embodiment decodes the encoded data generated by the intra prediction encoding apparatus 1.

Below, results of experiments performed for verifying the effectiveness of the present invention will be shown.

When an image is encoded by fixing one of refline_x and refline_y at the closest position to the encoding target block (as shown in an example of FIG. 10), an occurrence probability distribution for showing the selection state of the other non-fixed one of refline_x and refline_y is shown in FIG. 14 as experimental results.

Here, an image (the sequence of Bus as a standard image used in ISO and ITU_T standards) of a CIF size (352×288) was used, where quantization parameter QP (which indicates the width (i.e., roughness) of quantization) was set to 28, and 15 frames were encoded.

In the relevant experiment, for each 4×4 block, a set of refline_x and refline_y was regarded as an event, the number of events was obtained, and the probability for each set was computed. Each figure in parentheses indicates the occurrence probability of each set. As no operation is executed when 1≦refline_x and 1≦refline_y, "N/A" (not applicable) is shown in such an area.

In accordance with the results of the experiment, the rate of referring to the conventional position p0 (i.e., refline_x=refline_y=0) is approximately 60%, while the rate of referring to the other positions is approximately 40%.

That is, it could be verified that at a considerably large rate, it is more preferable to use reference pixels other than those selected by "refline_x=refline_y=0".

Figure 15:
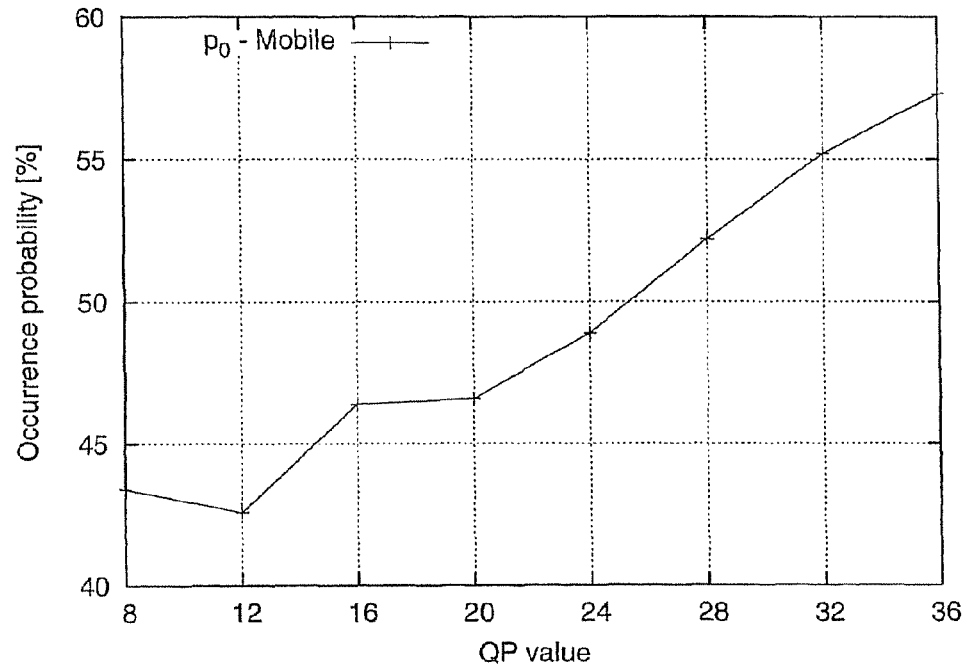
FIG. 15 is also a diagram explaining results of an experiment performed for verifying the effectiveness of the present invention.
Figure 16:
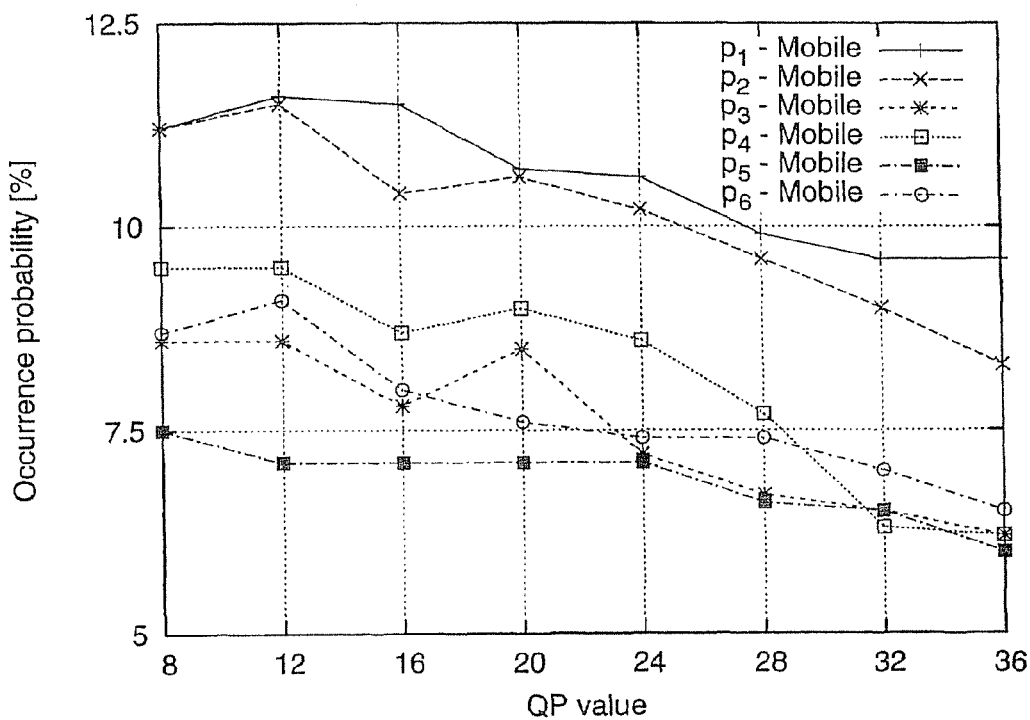
FIG. 16 is also a diagram explaining results of an experiment performed for verifying the effectiveness of the present invention.

FIGS. 15 and 16 show results of an experiment for obtaining variations in the occurrence probabilities shown in FIG. 14 when changing the quantization parameter QP, where a different image (the sequence of Mobile which is also a standard image as explained above) other than the image used in the experiment of FIG. 14 was used.

FIG. 15 shows the obtained variation for $p_0$ (refline_x=refline_y=0). FIG. 16 shows the obtained variations for $p_1$ (refline_x=1 and refline_y=0), $P_2$ (refline_x=0 and refline_y=1), $p_3$ (refline_x=2 and refline_y=0), $p_4$ (refline_x=0 and refline_y=2), $p_5$ (refline_x=3 and refline_y=0), and $P_6$ (refline_x=0 and refline_y=3).

In accordance with the above experimental results, as the value of quantization parameter QP increases, the probability of referring to the position p0 increases while the probabilities of referring to the positions p1 to p6 decreases.

The reason for this may relate to the fact that an increase in the quantization parameter QP makes the encoded image rough and vague, and thus intra prediction using relatively distant pixels as reference pixels cannot provide specific effects.

In accordance with the above experimental results, it could be verified that when the quantization parameter QP was a value from 8 to 36, the rate for referring to a position other than position p0 was approximately 40 to 60%. Therefore, it could also be verified that when the amount of code required for the reference target information is not considered, the rate-distortion performance can be reliably improved.

In the present invention, reference target information must be encoded. Therefore, it is necessary to compare the encoding performance of the present invention with those of conventional techniques in consideration of a corresponding increase in the amount of code due to the encoding of the reference target information.

Figure 17:
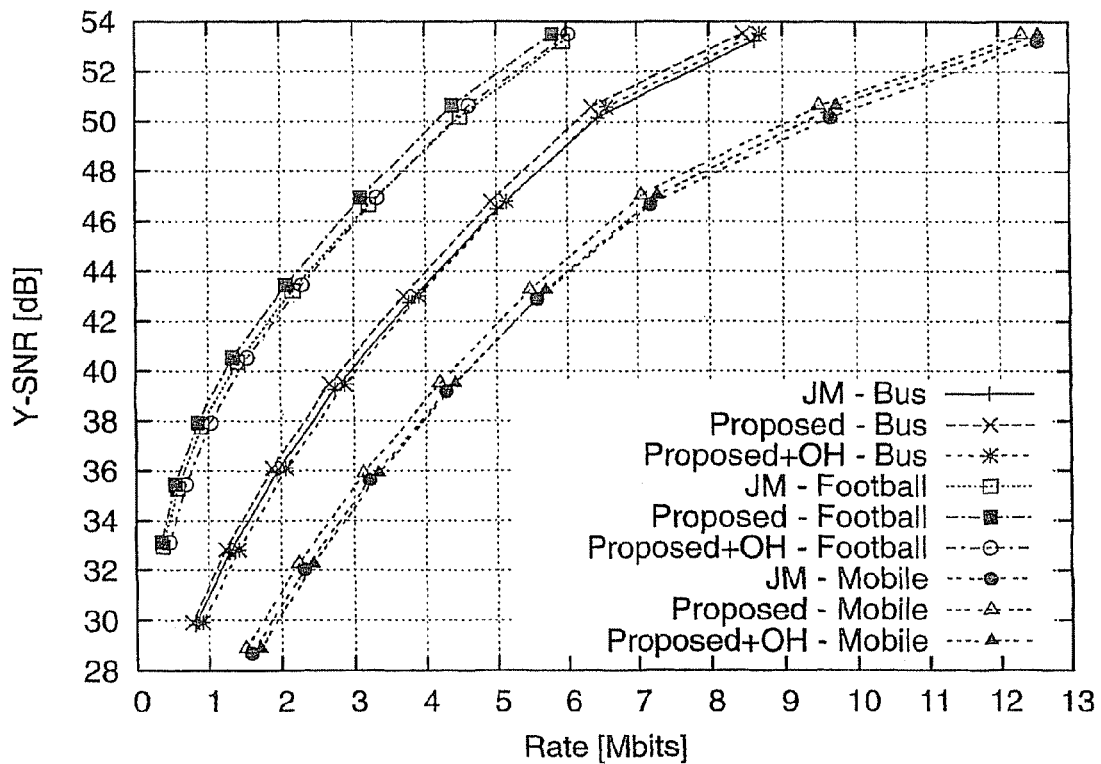
FIG. 17 is also a diagram explaining results of an experiment performed for verifying the effectiveness of the present invention.
Figure 18:
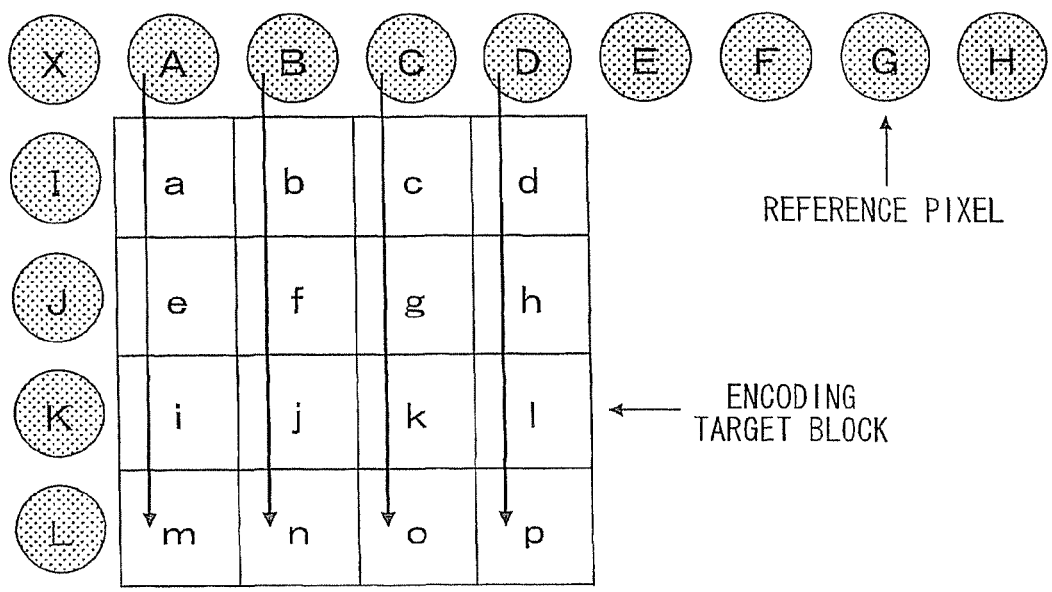
FIG. 18 is a diagram explaining a conventional technique.

FIG. 17 shows results of an experiment performed in consideration of the above. In FIG. 17, the horizontal axis indicates the amount of generated code, and the vertical axis indicates the image quality. In addition, the curve "JM" shows the experimental result for the conventional method; the curve "Proposed" shows the experimental result for the present invention without consideration of the amount of code required for the reference target information; and the curve "Proposed+OH" shows the experimental result for the present invention in consideration of the amount of code required for the reference target information.

In the above experiment, three types of images (Bus, Mobile, and Football images which are all standard images as explained above) were used; the quantization parameter QP was varied from 8 to 36 at each interval of 4; and 15 frames were encoded for each image, so as to obtain the results for each image.

The obtained amount of code required for the reference target information was computed by measuring 0-order entropy for each frame, based on the occurrence probability distribution (as shown in FIGS. 15 and 16) of each encoding target image.

In FIG. 17, the horizontal axis indicates the amount of generated code, and the vertical axis indicates the image quality. Therefore, the closer to the upper-left corner, the better the result is.

As understood by the experimental results, the present invention without consideration of the amount of code required for the reference target information always provides better performance than the conventional method. However, when considering the amount of code required for the reference target information, the present invention provides better or degraded performance in comparison with the conventional method.

In a case in which the amount of data required for the entire encoding is large (i.e., when the bit rate is high), the present invention provides considerable effects. This should be because the rate relating to the amount of code required for the reference target information is relatively small.

In accordance with the above-described experimental results, it could be verified that the present invention can improve the rate-distortion performance under a high bit-rate condition.

The above-described standard images can be obtained, for example, by http://media.xiph.org/video/derf/ and http://trace.eas.asu.edu/yuv/index.html.

INDUSTRIAL APPLICABILITY

In accordance with the present invention, efficient intra prediction can be applied to an image which includes an occlusion or noises, or an image in which signals having similar spatial frequencies periodically appear, where such images cannot be handled in conventional intra prediction. Therefore, it is possible to improve compression efficiency.

The invention claimed is:

1. A video encoding method using intra prediction, the method comprising the steps of:
    setting candidates for reference pixels to pixels within a predetermined distance range measured from an encoding target block;
    generating predicted signals, wherein this step includes:
        sequentially selecting reference pixels used for the intra prediction of the encoding target block with respect to a predetermined prediction mode from among the reference pixel candidates while changing a distance condition which indicates a distance measured from the encoding target block to the reference pixel candidates, wherein the selected reference pixels include at least one of:
        a set of pixels, which form a reference line that is positioned on the upper side of the encoding target block, and is parallel to an upper edge line of the encoding target block, and
        a set of pixels, which form a reference line that is positioned on the left side of the encoding target block, and is parallel to a left edge line of the encoding target block; and
        the distance to each reference line is measured from the corresponding edge line of the encoding target block; and
        generating each of the predicted signals based on the reference pixels selected for each distance condition;
    computing an encoding cost required for subjecting the encoding target block to intra prediction encoding using each of the generated predicted signals;
    finally determining reference pixels used for the intra prediction of the encoding target block based on each computed encoding cost; and
    encoding information which indicates the position of the determined reference pixels.

2. The video encoding method in accordance with claim 1, wherein:
    in the step of generating predicted signals, the selected reference pixels include the set of pixels, which form the reference line on the upper side of the encoding target block and parallel to the upper edge line of the encoding target block, the set of pixels, which form the reference line on the left side of the encoding target block and parallel to the left edge line of the encoding target block, and a pixel at the intersection of the two reference lines, and each of the predicted signals is generated based on the selected reference pixels.

3. The video encoding method in accordance with claim 2, wherein:
    any one of the two reference lines is set to a fixed line closest to the encoding target block while making the position of the other reference line variable; and each of the predicted signals is generated based on the selected reference pixels.

4. The video encoding method in accordance with claim 1, wherein:
    the step of setting candidates for reference pixels includes determining the distance range used for setting the candidates in accordance with the value of a parameter which indicates the amount of quantization.

5. The video encoding method in accordance with claim 1, wherein:
    the step of generating predicted signals includes sequentially applying prediction methods corresponding to a plurality of prediction modes to the selected reference pixels; and generating a predicted signal for each prediction method;
    the step of computing an encoding cost includes computing each encoding cost using each generated predicted signal; and
    the video encoding method further comprising the step of:
    encoding the prediction mode of the predicted signal used for computing the encoding cost by which the reference pixels are determined.

6. A non-transitory computer-readable storage medium which stores a video encoding program by which a computer executes the steps in the video encoding method in accordance with claim 1.

7. A video decoding method using intra prediction, the method comprising the steps of:
    obtaining reference target information, which indicates how distant reference pixels used in encoding are positioned from an encoding target block with respect to a predetermined prediction mode, by decoding encoded data of the reference target information;
    acquiring reference pixels used in intra prediction encoding of the encoding target block based on the obtained reference target information; and
    restoring a predicted signal used in the intra prediction encoding of the encoding target block based on the acquired reference pixels, and generating a decoded image signal using the predicted signal, wherein
    in the encoding, the reference pixels include at least one of:
        a set of pixels, which form a reference line that is positioned on the upper side of the encoding target block, and is parallel to an upper edge line of the encoding target block, and
        a set of pixels, which form a reference line that is positioned on the left side of the encoding target block, and is parallel to a left edge line of the encoding target block; and
        the distance to each reference line is measured from the corresponding edge line of the encoding target block.

8. A non-transitory computer-readable storage medium which stores a video decoding program by which a computer executes the steps in the video decoding method in accordance with claim 7.

9. A video encoding apparatus using intra prediction, the apparatus comprising:
    a device that sets candidates for reference pixels to pixels within a predetermined distance range measured from an encoding target block;
    a device that generates predicted signals by:
        sequentially selecting reference pixels used for the intra prediction of the encoding target block with respect to a predetermined prediction mode from among the reference pixel candidates while changing a distance condition which indicates a distance measured from the encoding target block to the reference pixel candidates, wherein the selected reference pixels include at least one of:
- a set of pixels, which form a reference line that is positioned on the upper side of the encoding target block, and is parallel to an upper edge line of the encoding target block, and
- a set of pixels, which form a reference line that is positioned on the left side of the encoding target block, and is parallel to a left edge line of the encoding target block; and
- the distance to each reference line is measured from the corresponding edge line of the encoding target block, and
- generating each of the predicted signals based on the reference pixels selected for each distance condition;

a device that computes an encoding cost required for subjecting the encoding target block to intra prediction encoding using each of the generated predicted signals;

a device that finally determines reference pixels used for the intra prediction of the encoding target block based on each computed encoding cost; and a device that encodes information which indicates the position of the determined reference pixels.

10. A video decoding apparatus using intra prediction, the apparatus comprising:

a device that obtains reference target information, which indicates how distant reference pixels used in encoding are positioned from an encoding target block with respect to a predetermined prediction mode, by decoding encoded data of the reference target information;

a device that acquires reference pixels used in intra prediction encoding of the encoding target block based on the obtained reference target information; and a device that restores a predicted signal used in the intra prediction encoding of the encoding target block based on the acquired reference pixels, and generates a decoded image signal using the predicted signal, wherein in the encoding, the reference pixels include at least one of:
- a set of pixels, which form a reference line that is positioned on the upper side of the encoding target block, and is parallel to an upper edge line of the encoding target block, and
- a set of pixels, which form a reference line that is positioned on the left side of the encoding target block, and is parallel to a left edge line of the encoding target block; and
- the distance to each reference line is measured from the corresponding edge line of the encoding target block.

* * * * *